(12) United States Patent
Abraham et al.

(10) Patent No.: US 8,275,757 B2
(45) Date of Patent: Sep. 25, 2012

(54) APPARATUS AND METHOD FOR PROCESS MONITORING

(75) Inventors: Maurice Haman Abraham, Reading (GB); Paul William Turner, Reading (GB); Michael Carter, Ascot (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1936 days.

(21) Appl. No.: 11/153,861

(22) Filed: Jun. 14, 2005

(65) Prior Publication Data
US 2006/0004852 A1  Jan. 5, 2006

(30) Foreign Application Priority Data
Jun. 15, 2004  (GB) .................................. 0413329.4

(51) Int. Cl.
*G06F 17/30* (2006.01)
(52) U.S. Cl. ....................................................... 707/694
(58) Field of Classification Search .................. None
See application file for complete search history.

(56) References Cited

U.S. PATENT DOCUMENTS

| | | | | |
|---|---|---|---|---|
| 6,014,673 A | * | 1/2000 | Davis et al. | 707/202 |
| 6,493,675 B1 | * | 12/2002 | Kanaya et al. | 705/7 |
| 7,017,129 B2 | * | 3/2006 | Ouyang | 716/4 |
| 2003/0225769 A1 | * | 12/2003 | Chkodrov et al. | 707/100 |
| 2003/0236689 A1 | * | 12/2003 | Casati et al. | 705/7 |
| 2004/0078105 A1 | | 4/2004 | Moon et al. | 700/100 |
| 2004/0078258 A1 | * | 4/2004 | Schulz et al. | 705/9 |

OTHER PUBLICATIONS

"WebLogic Process Interator Overview", *BEA WebLogic Collaborate Release 1.0*, Jun. 20, 2001. http://e-docs.bea.com/wlcollab.v1_0/wlpiug.chl.html.
"Connection",*ILOG Newsletter*,Summer 2001.http://www.ilog.com/corporate/connection/summer_2001/workflow.htm.

* cited by examiner

*Primary Examiner* — Yuk Ting Choi

(57) ABSTRACT

A method is described for monitoring a plurality of process instances, such as business process instance. The method comprises: providing a model object reflecting a workflow common to the process instances, the model comprising a plurality of nodes with at least some of the nodes being capable of assuming at least active and blocked states; receiving events and changing the states of the nodes in corresponding model object instances in accordance with the events received so as to reflect the status of the process instances, repeatedly determining an "at risk" state indicator for the model instances, the "at risk" state indicator when set for a model instance indicating that the corresponding workflow instance is in a state in which it cannot progress to a normal completion without encountering a node in the blocked state.

15 Claims, 4 Drawing Sheets

APPARATUS AND METHOD FOR PROCESS MONITORING

BACKGROUND TO THE INVENTION

The present invention relates to an apparatus and method for monitoring a process.

To achieve increased levels of quality, throughput and service at reduced costs individuals and companies are to an ever greater extent relying on automated and computer-controlled business processes.

It is therefore becoming increasingly important for business managers to understand the status of their computer-controlled business processes and, in consequence, monitoring systems have been developed to enable, for instance, a user to formulate queries and receive information regarding execution of a particular business process. An example of such a system can be found described in US 2003/0225769, for instance.

This invention is directed generally to enabling such systems to help business managers understand the business impact of computer resource failures and degraded service performance on their business and other processes.

SUMMARY OF THE INVENTION

To achieve this, in at least a preferred embodiment of the invention, a method is provided for monitoring a plurality of process instances, the method comprising: providing a model object reflecting a workflow common to the process instances, the model comprising a plurality of nodes with at least some of the nodes being capable of assuming at least active and blocked states; receiving events and changing the states of the nodes in corresponding model object instances in accordance with the events received so as to reflect the status of the process instances, repeatedly determining an "at risk" state indicator for the model instances, the "at risk" state indicator when set for a model instance indicating that the corresponding workflow instance is in a state in which it cannot progress to a normal completion without encountering a node in the blocked state.

In this way the full impact of a blocked node, ie a node that represents a part of the process that is inoperational for whatever reason including an IT infrastructure failure, can be assessed on all of the process instances that are in progress, including those processes that are not at a present time affected by the blocked node, but that will be so affected at a future time.

The method is particularly suited to the situation where the processes are business processes, although it will be understood that its application to any other kind of process is not excluded.

The method can comprise repeatedly determining a healthy state indicator for the model instances when set for a model instance indicating that the corresponding workflow instance is in a state in which it can progress to a normal completion without encountering a node in the blocked state.

The process instances can, for instance, be carried out at least in part by one or more computer systems.

The nodes can represent predeterminable episodes of the process instances.

The method can comprise defining the model object using a model creation environment.

Preferably, the model object comprises a directed graph comprising the nodes and in one embodiment the method comprises traversing the graph backwards from each blocked node marking nodes not already marked with a first indicator, traversing the graph backwards from each end node marking nodes not already marked with the first indicator with a second indicator; and then for each model object instance: scanning all the nodes marked with the first indicator and if there are any active nodes then marking the associated model object instance with the "At Risk" state indicator; scanning all the nodes marked with the second indicator and if there are any active or completed nodes marked with the second indicator, then marking the associated model object instance with the "Healthy" state indicator.

In another aspect, there is provided apparatus for monitoring a plurality of process instances, that may be carried out for instance at least in part by one or more computer systems, and which have a common workflow, the apparatus comprising a model object reflecting the workflow, the model comprising a plurality of nodes with at least some of the nodes being capable of assuming at least active and blocked states, the apparatus being arranged to receive events, from the computer systems for instance, and change the states of the nodes in a corresponding model object instances in accordance with the events received so as to reflect the status of the process instances, the apparatus being arranged to repeatedly determine an "at risk" state indicator for the model instances, the "at risk" state indicator when set for a model instance indicating that the corresponding workflow instance is a state in which it cannot progress to a normal completion without encountering a node in the blocked state.

The at risk state indicator can be determined by defining a zone in the model based on the model topology and the location therein of a blocked node which is not active in a process instance.

BRIEF DESCRIPTION OF THE DRAWINGS

An embodiment of the invention will now be described, by way of example only, with reference to the accompanying drawings, wherein.

DETAILED DESCRIPTION OF THE PREFERRED EMBODIMENT

Figure 1:
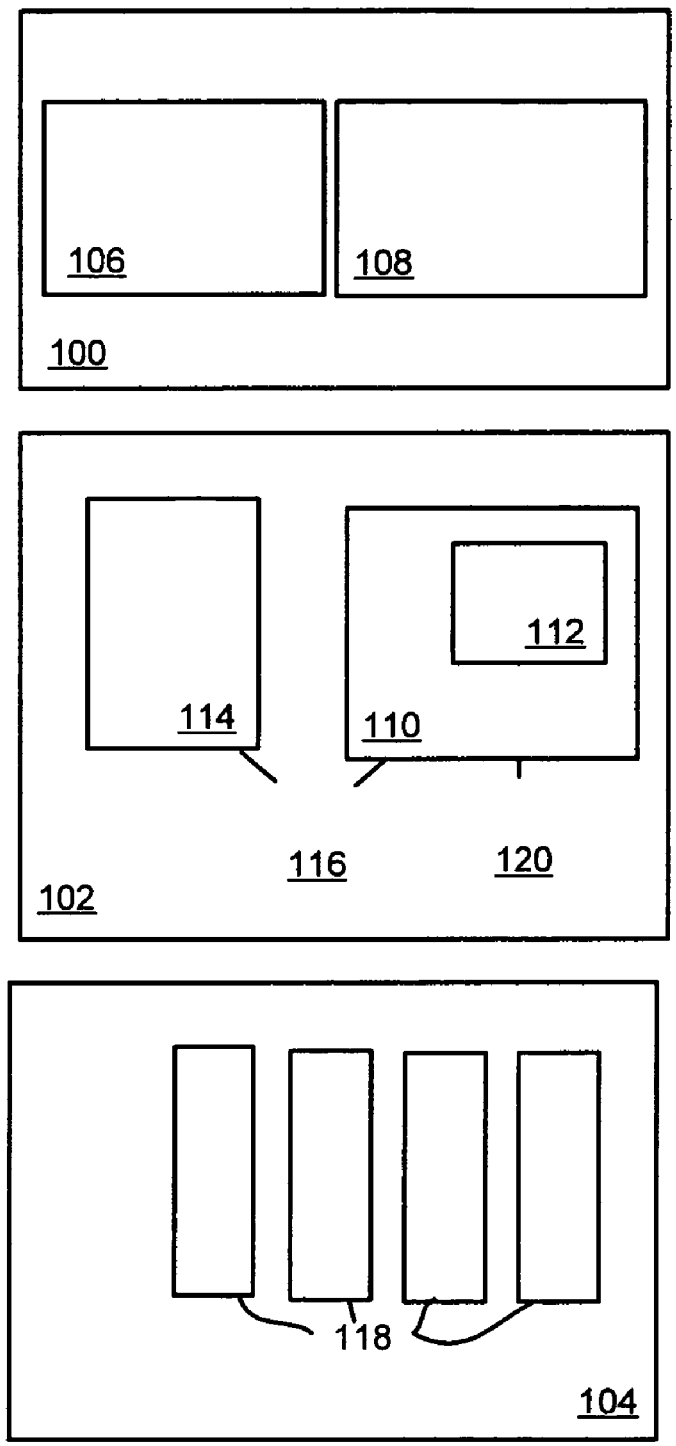
FIG. 1 is a schematic block diagram illustrating a business process monitoring application in accordance with an embodiment of the present invention.

The workflow monitoring software of the present embodiment is illustrated in schematic form in FIG. 1 and comprises view layer 100, a business context layer 102 and an event layer 104. It will be understood that physically the 3 layers could be implemented separately and on different computers, a feature that can lead to greater scalability and an ability to process more process instances simultaneously.

The view layer 100 comprises a web console 106 implemented using any suitable known techniques such as html, Javaserver pages and using a suitable servlet container, such as Apache Tomcat. Web console 106 is responsible for the display of the flow status through a remote web browser (not shown). View layer 100 also comprises notification module 108 which serves to generate alerts of various kinds, such as e-mail alerts or SMS alerts, upon occurrences of definable conditions impacting the business process being monitored.

Again, the general operation of a notification module of this kind is conventional will be well understood by those skilled in the art.

Business context layer 102 comprises a business context engine (BCE) 110, including a business object manager (BOM) 112. The general function of these components is to receive and process events occurring in a set of external computer-controlled or other business systems and to derive business impact information from those events using the kind of logical models to be described below. Thus, business context engine 110 consumes events received from event layer 104, and passes the resulting business impact information to the view layer 100 for delivery as an alert or presentation via web console 106.

Business context layer 102 further comprises a modeller component 114. Modeller component 114 provides a model creation environment which utilizes a framework for a unified user interface through which users can design, deploy and debug the models used by the other components, for events, data, business flows, and traps. The models are stored in a model repository illustrated at 116 and take the form of a set of suitably programmed objects.

As will be understood by those skilled in the art, object-oriented programming techniques involve the definition, creation, use and destruction of objects. These objects are software entities comprising data elements and routines, or methods, which manipulate the data elements. The data and related methods are treated by the software as an entity and can be created, used and deleted as if they were a single item. Together, the data and methods enable objects to model entities in terms of their characteristics, which can be represented by the data elements, and its behavior, which can be represented by its methods. In this way, objects can model real world entities such as customer orders, people, services or computers.

Objects are defined by creating "classes" which are not objects themselves, but which act as templates that instruct the compiler or interpreter how to construct instances of the actual object. A class may, for example, specify the number and type of data variables and the steps involved in the methods which manipulate the data. An object is instantiated in the program by means of a special method called a constructor which uses the corresponding class definition and additional information, such as arguments provided during object instantiation, to construct the object. The models stored in a model repository illustrated at 116 take the form of a set of suitably programmed objects of this kind.

Figure 2:
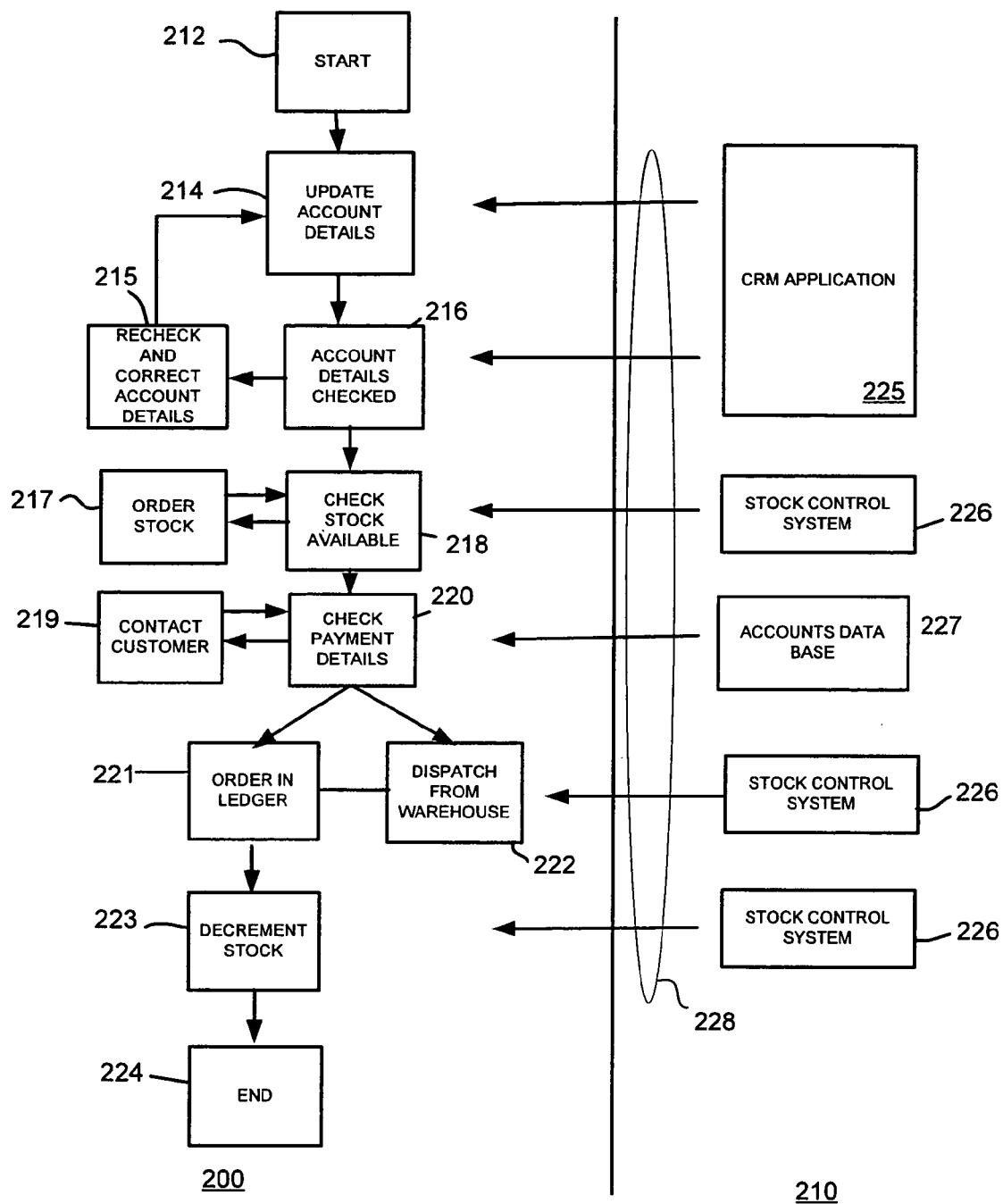
FIG. 2 illustrates a workflow model that might be used to monitor an exemplary business process.

For the purposes of this example, 3 kinds of objects will be described. Business data objects represent specific entities within the business such as orders or customers, for instance, and business workflow objects represent specific "workflows" in the business. Typically, these workflows will be defined in terms of episodes in the lifecycle of business objects, for example, customer orders. Business workflow instances receive and process events and maintain information on the state of nodes in a business workflow and optionally other workflow data as necessary. An example of such a workflow model is illustrated in FIG. 2, which shows a workflow model for the processing of customer orders.

A further object type is service status objects that are used to represent the status of a specific service that a business workflow may depend upon, for instance particular database services, internet servers, stock control systems or the like.

Event Layer 104 comprises a set of suitably arranged adapters 118 which are adapted to collect events, typically from probes arranged in external computer systems, although events could be entered manually or in any other suitable way, and pass them to the business context layer 102 for processing. Business Context Engine 110 processes events and generates business impact alerts using the logic of the model objects.

An engine state database 120 is used to store the state of the business objects within the system. The view layer, or other external presentation or query software, can then access this database in a read-only fashion in order to get information about business objects. To make a change to a business object, an event is sent into the business context engine 110.

The business object manager 112 manages the events that arrive from event layer 104 and the propagation of the events to the relevant business objects. Business object manager 112 is passive and simply takes actions as a result of the receipt of an event. Business data objects receive and process events and maintain information in fields within the objects according to the way they are programmed, and under appropriate trap conditions, may also generate consequential events that are passed back to the business object manager 112 for transmission to other objects.

Referring to FIG. 2, the work flow model 200 in the example shown there comprises a sequence of nodes 212, 214, 215, 216, 217, 218, 219, 220, 221, 222, 224. The nodes are interconnected by arcs to show the expected direction of the flow and the order in which nodes are expected to be completed, but the arcs themselves have no effect on how the work flow is progressed, this being defined by entry and exit conditions associated with each of the nodes.

There are three types of nodes: start nodes such as start node 212; activity nodes such as nodes 214, 215, 216, 217, 218, 219, 220, 221, 222 and end nodes such as end node 224. Each node can have separate criteria for entry and exit of the node and assumes an active state when the entry criteria are met and remains in the active state until the end criteria are met, in which event it assumes a "completed" state. The entry and exit criteria for each node define respectively the conditions under which each separate business task is deemed to have started and to have been completed and serve to drive progress through the workflow model.

It is possible to define nodes that have the same exit criteria as entry criteria and that are completed as soon as they are activated; for example as in the case of decrementing a stock total. Activity nodes can have arcs entering and leaving them. Start nodes are the normal start point for a flow and can have arcs leaving them, but not entering them. End nodes are the normal end point for a flow and can have arcs entering them, but not leaving them. When an end node meets its exit condition, the business context engine 110 stops monitoring the workflow instance except for out of sequence events which continue to be processed.

It will be understood that a business workflow model of the above-described type can be designed for monitoring purposes only and does not need to include all the activities that take place or are carried out in the corresponding business process. Rather the model may reflect only those activities that are to be monitored in order to understand whether the process is functioning properly.

The business flow example illustrated in FIG. 2 is intended for an organisation that provides products that can be sent from a warehouse but also from a shop. In the example, the organisation has a customer relationship management system 225, a stock control system 226 and an accounts database 227. Customer relationship management system 225, stock control system 226 and accounts database 227 are external computer systems that are provided with probe elements (not shown) that serve to generate event streams—designated at 228—that are transmitted via event adapters 118 to business context engine 110.

Figure 3:
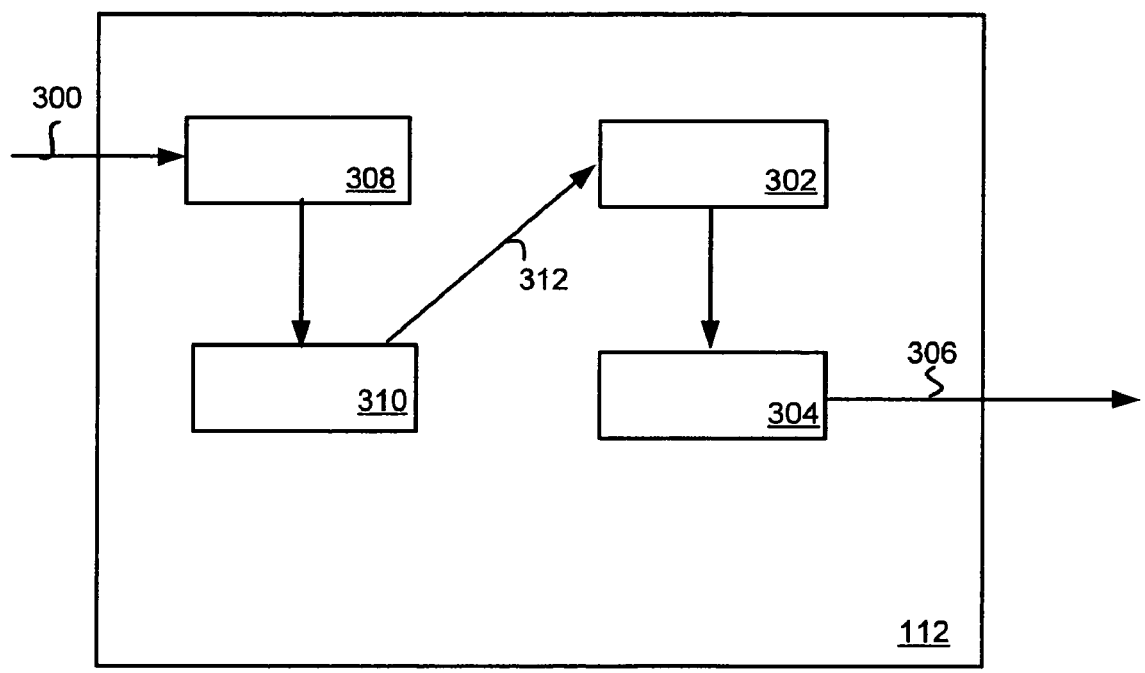
FIG. 3 illustrates event handling in the application of FIG. 1.

In order to illustrate the general operation of the system and the interaction of object instance within business object manager 112, FIG. 3 illustrates possible event sequences within the business object manager 112.

As shown in FIG. 3, events come into the system via event layer 104, as shown at 300.

In the example shown in FIG. 3, events that come into the system concern objects, such as customer orders, that have an associated business data object. The relevant business data model 308 passes the event directly to the associated business data object instance 310 that represents the particular object, e.g. the particular order. If the business data object instance 310 does not exist for the appropriate external object, then it can be created before passing on the event. For example, if a particular order is unknown to the system, in the sense that an associated business object instance does not exist, then a business data model may be arranged to create an instance for the order.

As a result of the business data object receiving the event, it may change its internal state and may then be arranged to generate further events 312 that are directed to the Business workflow model 302. This in turn would usually pass the event directly onto the associated business workflow instance 304 that represents the particular identifiable workflow (e.g. the workflow for the particular order). If the business flow instance does not exist for the appropriate external object, then it too can be created before passing on the event.

Depending on the significance of the change to the business flow instances, the affected instances may contain rules that are arranged to detect certain internal conditions relating to the workflow and generate a notification event 306 that may go to the notification component 108 for the generation of an alert, for instance, or may be directed to other components within business context engine that serve to accumulate events generated by the workflow instances to calculate total and/or average values, for instance, and apply rules to those for the purposes of generating alerts. The definitions of the rules applied are assumed to be configurable, via the modeller 114, so that any detectable condition or quantity can be monitored in any desired fashion.

Events 300 coming into the business object manager may directly concern workflow objects, in which case they are directed directly to workflow object 302, or may concern service status objects, which are arranged to generate events for any affected workflow objects and which operate in a similar manner to that described above.

It will be appreciated that the above description reflects a simplified form of modelling and that more complex models may be used. The above description has been presented for the purposes of example and for enabling the features of the techniques described below to be understood.

Figure 4A:
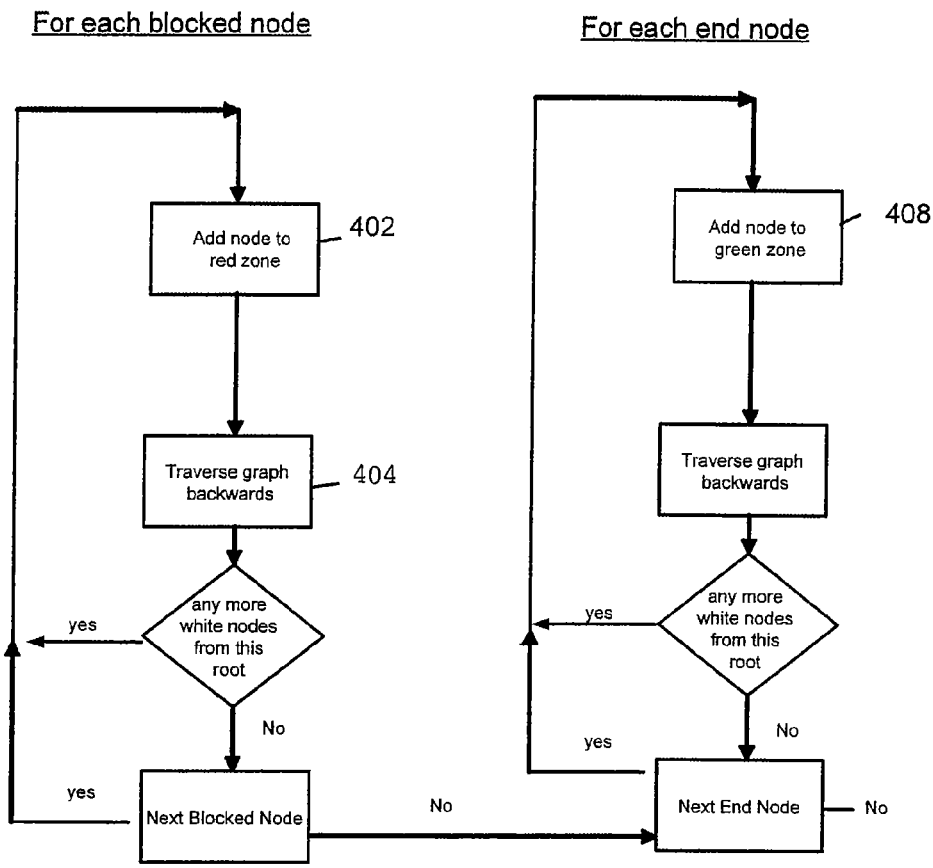
FIGS. 4a and 4b are flow diagrams illustrating a method for determining the status of a workflow instance that has at least one blocked node.
Figure 4B:
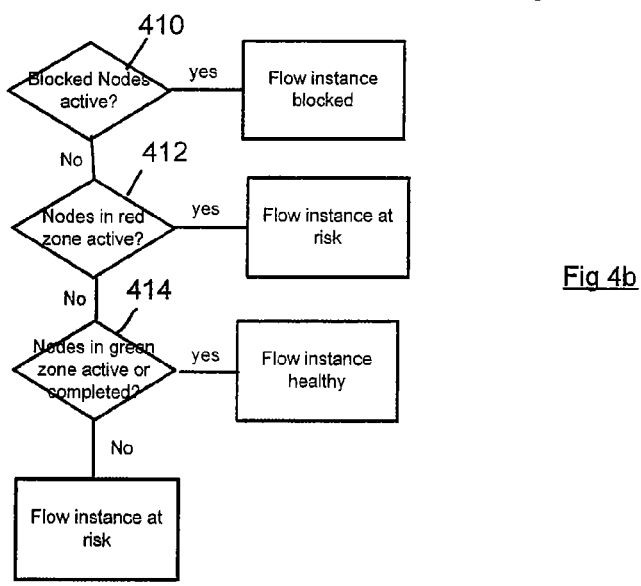

In order to provide a mechanism that monitors the progression of business flows and assesses the impact of infrastructure failures on those business flows, the set of nodes are stored as a directed graph within the workflow model object. The method to be described below with reference to FIGS. 4a and 4b is provided in the workflow model object to determine if a business flow instance is either currently blocked, at risk of being blocked, or at no risk of being blocked.

As described above, there are three types of nodes (Start, Activity and End). Each node can have separate entry and exit criteria. In addition, each node can be dependent on one or more services. When a service failure impacts the operation of a node or a node is otherwise known to be unavailable, that node is marked as being "blocked" in the model.

An active flow instance, in other words a workflow instance where the start node has been active and for which the end node has not yet completed, can be in one of three states:

"Blocked"—if there is an active node that is blocked (i.e. currently down).

"At Risk"—if the flow cannot progress to a normal completion without encountering a blocked node.

"Healthy"—if the flow is able to complete to all possible conclusions without hitting any blocked nodes.

The detection of "Blocked" workflow instances is carried out by checking if there are any active nodes that are currently blocked (i.e. currently down due to resource problem or similar reason). If for any workflow instance, there are active nodes that are currently blocked then the status of the workflow instance is "blocked".

The algorithm described below with reference to FIG. 4 is used for the detection of "At Risk" and "Healthy" workflow instances.

The following considerations are taken into account:

A workflow instance may be in a state where it has no active nodes. This is because it is possible to define nodes that have the same exit criteria as entry criteria. In other words, the nodes never become "active" but just complete immediately. In workflow models that have nodes of this type, it is harder to determine what stage the flow has reached. This is particularly true if the possibility of missed events is allowed. In these cases the current state of overall completion of the workflow instance may only be partially known.

Branching—when the flow contains a branch, such as the branch after node 220 in the example of FIG. 2, the branch could either be a "choice" where only one path is normally taken or a "parallel" where both paths are taken. The model may not require the user to indicate explicitly which type of branch it is.

Loops—workflow models can contain loops which could mean that nodes can be both before and after blocked nodes at the same time.

Standalone Nodes—it is possible to have "standalone" nodes that are not used in the normal flow, but are being used as "flags" to indicate some state of the flow. These nodes cannot complete the process as they do not lead to end nodes.

The basic approach is to repeatedly divide the nodes of the model up into three zones (designated for convenience only by the colours red, green and white):

The "Red Zone" contains all nodes that can reach a "blocked" node (but not the "blocked" node itself, unless it is before another blocked node or itself in a loop);

The "Green Zone" contains all nodes that are not in the "red zone" but are either "end nodes" or nodes that can reach an "end node";

The "White Zone" contains all the nodes that are not in either the "red zone" or the "green zone".

The algorithm then decides for each workflow instance whether the workflow instance should be designed as "at risk" or not by performing the following tests in the order given, and stopping as soon as a match is found:

1. If any "blocked" node is active in any workflow instance, then that workflow instance is "Blocked" as described above 2. If there are any active nodes in the "red zone" in any workflow instance, then the workflow instance is "At Risk";

3. If there are any active nodes in the "green zone" in any workflow instance, then the workflow instance is "Healthy"

4. If there are any completed nodes in the "green zone" in any workflow instance, then the workflow instance is "Healthy"
5. Otherwise, the workflow instance is "At Risk"

The basic algorithm is as follows and as shown in FIGS. 4a and 4b, all nodes start as white and steps 1 and 2 are carried out on the model object:

1. For each "blocked" node, traverse the directed graph backwards adding each node (excluding the initial occurrence of the "blocked" node itself) to the "red zone"—steps 402 and 404. If in traversing backwards, the algorithm comes across a node that is not white (ie it has already been marked as in the "red zone"), then it is not necessary to traverse back beyond the node, as it has already been visited by the algorithm.
2. For each "end node", traverse the directed graph backwards adding each node (including the "end node" itself) into the "green zone"—step 408. If in the traversing backwards the algorithm comes across a node that is not white (ie it has already been marked as in the "green zone" or in the "red zone", then it does not need traverse back beyond that node, as it has already been visited by the algorithm.
3. For each workflow instance:
3.1. Scan all the "blocked" nodes and if there are any active nodes mark the associated business workflow object as "Blocked"—step 410
3.2. Scan all the nodes in the "red zone" and if there are any active nodes then mark the associated business workflow object instance as "At Risk"—step 412.
3.3. Scan all the nodes in the "green zone" and note if there are any active nodes or completed nodes—step 414. If there are any active or completed nodes, then mark the associated business workflow object instance as "Healthy".
3.4. If the algorithm reaches this point without having set the state of the business workflow object instance, then set it to "At Risk".

Using the states of the workflow instances set in the manner described above, the full impact of a blocked node, ie a node that represents a part of the process that is inoperational can be assessed on all of the process instances that are in progress, including those processes that are not at a present time affected by the blocked node, but that will be so affected at a future time. The impact of a blocked node can be calculated for instance by using other data, such as the value of an order or other weighting factors, associated with "blocked" or "at risk" workflow instances.

In addition, historical trend information may be accumulated to deduce the point at which an "at risk" workflow instance will become blocked. For instance, if it is known to take 2 hours to move from the current location of a specific instance to a blocked node, the "At risk" status can be supplemented with the expected time that the workflow instance will become blocked.

It will be appreciated that commercialised forms of the present embodiment would in practice take the form of a set of classes and/or other computer programs adapted to run on general-purpose computing platforms within general-purpose operating environments such as are provided by the Microsoft Windows, Linux or HP-UX operating systems and their related programming libraries and tools. These programs may be marketed in the form of suitably coded computer program products including program code elements that implement the functionality described. It will be appreciated though that the techniques described may equally be implemented as special purpose hardware or any combination of software, hardware and/or firmware. The above discussion is meant to be illustrative of the principles and various embodiments of the present invention. Numerous variations and modifications in each of the illustrated examples will become apparent to those skilled in the art once the above disclosure is fully appreciated. It is intended that the following claims be interpreted to embrace all such variations and modifications.

The invention claimed is:

1. A method for monitoring a plurality of process instances, the method comprising:
providing, by a computer, a model object reflecting a workflow common to the process instances, the model object comprising a plurality of nodes with at least some of the nodes being capable of assuming at least active and blocked states;
receiving, by the computer, events and changing the states of the nodes in corresponding model object instances in accordance with the events received to reflect the status of the process instances; and
repeatedly determining, by the computer, an "at risk" state indicator for the model instances, the "at risk" state indicator when set for a said model instance indicating that the corresponding workflow instance is in a state in which it cannot progress to a normal completion without encountering a node in the blocked state.

2. The method of claim 1 comprising repeatedly determining a healthy state indicator for the model instances when set for a model instance indicating that the corresponding workflow instance is in a state in which it can progress to a normal completion without encountering a node in the blocked state.

3. The method of claim 1 wherein the process instances are carried out at least in part by one or more computer systems.

4. The method of claim 1 wherein the nodes represent predeterminable episodes of the process instances.

5. The method of claim 1 comprising defining the model object using a model creation environment.

6. The method of claim 1 wherein the model object comprises a directed graph comprising the nodes.

7. The method of claim 6 comprising:
traversing the graph backwards from each blocked node marking nodes not already marked with a first indicator;
traversing the graph backwards from each end node marking nodes not already marked with the first indicator with a second indicator; and
for each model object instance:
scanning all the nodes marked with the first indicator and if there are any active nodes then marking the associated model object instance with the at risk state indicator; and
scanning all the nodes marked with the second indicator and if there are any active or completed nodes marked with the second indicator, then marking the associated model object instance with a healthy state indicator.

8. An apparatus for monitoring a plurality of process instances which have a common workflow, the apparatus comprising:
a memory storing a model object reflecting the workflow, wherein the model object comprising a plurality of nodes with at least some of the nodes being capable of assuming at least active and blocked states;
a processor arranged to receive events and change the states of the nodes in a corresponding model object instances in accordance with the events received to reflect the status of the process instances;
the processor being arranged to repeatedly determine an "at risk" state indicator for the model instances, the "at risk" state indicator when set for a said model instance indicating that the corresponding workflow instance is in a state in which it cannot progress to a normal completion without encountering a node in the blocked state.

9. The apparatus of claim 8 wherein the at risk state indicator is determined by defining a zone in the model based on a model topology and a location therein of a blocked node which is not active in a process instance.

10. The apparatus of claim 8 wherein the model comprises a directed graph.

11. A method for monitoring a plurality of process instances carried out at least in part by one or more computer systems, the method comprising:
providing, by a computer, a model object reflecting a workflow common to the process instances, wherein the model object comprises a directed graph comprising a plurality of nodes, with at least some of the nodes being capable of assuming at least active and blocked states;
receiving, by the computer, events and changing the states of the nodes in corresponding model object instances in accordance with the events received to reflect the status of the process instances;
repeatedly determining, by the computer, an "at risk" state indicator for the model instances, the "at risk" state indicator when set for a model instance indicating that the corresponding workflow instance is in a state in which it cannot progress to a normal completion without encountering a node in the blocked state; and
repeatedly determining, by the computer, a healthy state indicator for the model instances when set for a said model instance indicating that the corresponding workflow instance is in a state in which it can progress to a normal completion without encountering a node in the blocked state.

12. The method of claim 11 wherein the nodes represent predeterminable episodes of the process instances.

13. The method of claim 11 comprising defining the model object using a model creation environment.

14. The method of claim 11 comprising:
traversing the graph backwards from each blocked node marking nodes not already marked with a first indicator;
traversing the graph backwards from each end node marking nodes not already marked with the first indicator with a second indicator; and
for each model object instance:
scanning all the nodes marked with the first indicator and if there are any active nodes then marking the associated model object instance with the at risk state indicator; and
scanning all the nodes marked with the second indicator and if there are any active or completed nodes marked with the second indicator, then marking the associated model object instance with the healthy state indicator.

15. An apparatus for monitoring a plurality of process instances which have a common workflow, the apparatus comprising:
a memory storing a model object reflecting the workflow, the model object comprising a directed graph comprising a plurality of nodes with at least some of the nodes being capable of assuming at least active and blocked states;
a processor arranged to receive events and change the states of the nodes in a corresponding model object instances in accordance with the events received to reflect the status of the process instances;
the processor being arranged to repeatedly determine an "at risk" state indicator for the model instances, the "at risk" state indicator when set for a model instance indicating that the corresponding workflow instance is a state in which it cannot progress to a normal completion without encountering a node in the blocked state, wherein the at risk state indicator is determined by defining a zone in the model based on a model topology and a location therein of a blocked node which is not active in a process instance.

* * * * *